United States Patent [19]

Russell

[11] 3,855,159

[45] Dec. 17, 1974

[54] POLYURETHANE FOAM SYSTEM

[75] Inventor: Donald H. Russell, Cherry Hill, N.J.

[73] Assignee: Atlantic Richfield Company, Los Angeles, Calif.

[22] Filed: June 7, 1973

[21] Appl. No.: 367,987

[52] U.S. Cl.... 260/2.5 AM, 260/2.5 A, 260/18 TN, 260/37 N, 260/77.5 R, 260/77.5 B
[51] Int. Cl............................................. C08d 13/08
[58] Field of Search ....... 260/2.5 A, 77.5 R, 77.5 B, 260/2.5 AM

[56] References Cited
UNITED STATES PATENTS

| | | |
|---|---|---|
| 3,531,425 | 9/1970 | Burk, Jr. et al. ............... 260/75 TN |
| 3,652,507 | 3/1972 | Burk, Jr. et al. ............... 260/77.5 B |
| 3,658,805 | 4/1972 | Burk, Jr. et al. ............... 260/246 R |
| 3,702,320 | 11/1972 | Fritok et al. ................... 260/77.5 B |
| 3,746,667 | 7/1973 | Dieter et al. ..................... 260/2.5 A |
| 3,766,147 | 10/1973 | Wolgemuth .................... 260/77.5 R |

Primary Examiner—Melvyn I. Marquis
Attorney, Agent, or Firm—Coleman R. Reap

[57] ABSTRACT

A rapid foaming polyurethane system comprising a cyclic nitrile compound, an organic polyhydroxyl compound, an organic polyamine compound, and a condensation-rearrangement catalyst is presented. The cyclic nitrile compound and polyamine compound are isolated from each other until reaction is desired.

13 Claims, No Drawings

POLYURETHANE FOAM SYSTEM

BACKGROUND OF THE INVENTION

1. FIELD OF THE INVENTION

This invention relates to rapid foaming polyurethane systems and more particularly to a portable two-component system for rapidly producing stable polyurethane foams.

2. PRIOR ART

Since their recent development, polyurethane foams have become widely used as a construction material because of their excellent thermal insulating properties. Rigid polyurethane foams are commonly used where it is desired to provide thermal insulation such as on the back of home refrigerators and other refrigeration or heating equipment. Because these foams are formed "in situ" by spraying or otherwise applying a polyisocyanate and polyhydroxyl-containing compound to the surface it is desired to insulate, a very tight thermal seal is easily formed. Unfortunately, because of the tight seal, it is practically impossible to remove the foam to replace or make repairs to insulated equipment without damaging the foam or otherwise destroying the tight seal around the insulated equipment. A repairman removing the insulation would generally try to damage the insulation as little as possible and when the repairs are completed, he would replace the insulation as best he could and apply a caulking compound or some other form of sealant over the damaged area of the foam. As can readily be appreciated, this requires a considerable amount of time and effort and the resulting seal is often less than satisfactory.

Because of the need for applying relatively small amounts of thermal foam insulation, such as where it is desired to fabricate small thermally insulated units or to repair damage to thermal insulation, as in the abovedescribed situation, there has been a continuing demand for safe, easy-to-use portable foam systems which can be conveniently carried in a tool box or stored in a home, etc. One device which partially meets the needs of a portable polyurethane system is disclosed in U.S. Pat. No. 3,491,916. The invention disclosed therein is a polyurethane aerosol comprised of a two-compartment container, the compartments being separated by a frangible non-porous membrane. One of the compartments is charged with a polyol and a catalyst and the other with a polyisocyanate. Foam is produced by puncturing the membrane separating the polyol and polyisocyanate thereby permitting them to react. The system disclosed in this patent is not altogether suitable since it requires the use of polyisocyanates, which are highly toxic.

Polyurethane systems have been developed which are not based on polyisocyanates. These polyurethanes are formed by the reaction of cyclic nitrile compounds with polyols. Since cyclic nitrile compounds are much less toxic than isocyanates, they can be used more freely without the concern attendant the use of isocyanates. Patents which disclose polyurethane systems prepared from cyclic nitrile compounds and polyols are U.S. Pat. Nos. 3,480.595; 3,531,425; 3,560,492; 3,652,507; and 3,702,320 the disclosures of which are incorporated herein by reference. Unfortunately, the reaction between cyclic nitrile compounds and polyhydroxyl compounds does not take place at room temperature. It is usually necessary to heat the reactants at a temperature of about 150°to 250°C. to initiate the reaction betwen these materials. In view of this, polyurethane systems comprised solely of cyclic nitrile compounds and polyhydroxyl-containing compounds cannot be conveniently used in small portable aersol dispensers such as that disclosed in U.S. Pat. No. 3,491,916 since it would be dangerous and impractical to provide the heat necessary to initiate the condensation reaction between the cyclic nitrile compound and the polyhydroxyl compound.

SUMMARY OF THE INVENTION

A cyclic nitrile compound-based urethane system which is suitable for use in small portable aerosol containers and other dispensers has now been discovered. Because of this system, cyclic nitrile compound-based urethane foams can now be dispensed from small portable containers without the need for externally heating the reactants.

Accordingly, it is an object of the invention to present a portable polyurethane foam-producing system. It is a second object of the invention to present a portable polyurethane foam system which does not require external heat for activation. It is a third object of the invention to present a safe, convenient polyurethane foam-producing aerosol suitable for use in the home. It is a fourth objective of the invention to present a method of dispensing self-supporting polyurethane foam made from cyclic nitrile compounds and polyhydroxyl compounds without the necessity of heating the reaction system. These and other objects of the invention will become apparent from the following description and examples.

According to the invention, the above objects are achieved by providing a three-component reaction system comprised of a cyclic nitrile compound, an orgnaic polyhydroxyl compound, and an organic polyamine compound. The reaction system usually also contains a condensation-rearrangement catalyst, which may be incorporated into the cyclic nitrile compound component or the polyol-polyamine component. The cyclic nitrile compound component is stored separately from the other two compartments and preferably all of the components are simultaneously dispensed to provide intimate contact between the cyclic nitrile carbonate and the polyol and polyamine components.

DESCRIPTION OF THE INVENTION

THE CYCLIC NITRILE COMPOUNDS

The cyclic nitrile compounds used in the process of the invention have the structure

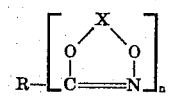

wherein X is carbonate,

sulfite,

oxalate,

or mixtures of these, n is at least 2, and R is an organic radical having from 2 to about 200,000 carbon atoms and is free of reactive hydrogens as determined by the Zerewitinoff test. Generally, R will consist essentially of carbon and hydrogen but there can be included therein other elements as well, as long as they do not materially affect the radical's basic characteristic of being non-interfereing in the condensation-rearrangement reaction between the cyclic nitrile compound and the reactive hydrogen groups of the organic polyol or polyamine compounds. Examples of such non-interfereing groups are alkoxy, nitro, and halo groups. R can be saturated or ethylenically or acetylenically unsaturated aliphatic radicals, saturated or ethylentically unsaturated cycloaliphatic radicals or aromatic radicals, including alkaryl, aralkyl, and fused-ring aromatic radicals.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used in the invention is at least 2 and is often as high as 100,000 or more. Thus, n, in the above structural formula, is at least 2 and may be very much higher than 2, depending upon the type of foam being prepared. In one preferred embodiment of the invention n varies from 2 to 6.

The preparation of the cylic nitrile compounds useful in the invention forms no part of the invention, and one desiring to explore their preparation may refer to the above-mentioned patents and U.S. Pat. Nos. 3,507,900; 3,560,492; and 3,609,163, all of which are incorporated herein by reference.

Typical of the aliphatic cyclic nitrile compounds useful in the invention are:

1. Saturated aliphatic and cycloaliphatic compounds such as 1,2-ethane di(nitrile carbonate); 1,4-butane di(nitrile sulfite); 1,20-eicosane di(nitrile oxalate); 1,40-tetracontane di(nitrile carbonate); 5-ethyl-1,16-hexadicane di(nitrile carbonate); 1,3,5-pentane tri(nitrile sulfite); 1,4,6,10-decane tetra(nitrile carbonate); 6-methyl-1,5,8-octane tri(nitrile oxalate); 1,4-cyclohexane di (nitrile carbonate); etc. 1,3,5-cyclohexane tri(nitrile carbonate); etc.

2. Unsaturated aliphatic and cycloaliphatic compounds such as 1,2-ethane-di-nitrile carbonate); 1,4-butene-2-di(nitrile sulfite); 1,6,9-nonene-2-tri(nitrile oxalate); 3-propyl-1,5,7-heptene2tri-(nitrile carbonate); 1,4-butyne-2d-nitrile carbonate); 1,4-cyclo-hexene-2-di(nitrile carbonate); etc.

3. Aromatic compounds such as benzene-1,3-di(nitrile carbonate); benzene-1,4-di(nitrile sulfite); 1,4-dimethylbenzene-2,5-di(nitrile carbonate); and 1,-3-diethylbenzene-2,4-di(nitrile oxalate); methylbenzene-di(nitrile carbonate); 1-benzylbenzene-2,4-di(nitrile carbonate); naphthalene-1,7-di(nitrile carbonate); 1,2,3,4-terahydronaphthalene-di(nitrile carbonate); 2,2-diphenylpropane-p,p-40-di(nitrile carbonate); diphenylmethane-p,p'-di(nitrile carbonate); anthracene-2,8-di(nitrile carbonate); 1,2-diphenylethane-p,p'-di(nitrile carbonate); biphenyl-di(nitrile carbonate); 1,2-diphenylethane-o,o'-di(nitrile oxalate); stilbene-p,p'-di(nitrile carbonate); and stilbene-o,o'-di(nitrile sulfite).

Although cyclic nitrile sulfites and cyclic nitrile oxalates function as well as and sometimes better than cyclic nitrile carbonates, they are not as suitable as cyclic nitrile carbonates since the sulfite produce sulfur dioxide, an obnoxious and toxic gas, and the oxalates produce carbon monoxide, also a very toxic gas. Since the carbonates, upon reaction, release harmless and odorless carbon dioxide, these are much more suitable, especially in products intended for general use in the home. Thus, the preferred cyclic nitrile compounds are the saturated aliphatic cyclic nitrile carbonates containging 2–12 carbon atoms such as 1,2-ethane di(nitrile carbonate); 1,4-butane di(nitrile carbonate); and 1,4,8-octane tri(nitrile carbonate).

THE ORGANIC POLYHYDROXYL COMPOUNDS

The organic polyhydroxyl compounds useful in the invention include aliphatic and aromatic polyols, and polymers such as polyesters, polyethers, and polylactones, and similar compounds having from 2 to 6 or more, but preferably 3 or more, —OH groups per molecule and having 2 to about 100,000 carbon atoms with hydroxyl numbers ranging from 12 to 1,100 or more. Mixtures of two or more of these compounds can also be employed.

The aliphatic and aromatic polyols include, for example, ethylene glycol; diethylene glycol; thiodiethylene glycol; propylene glycol; 1,3-butylene glycol; 1,6-hexanediol; butenediol; butynediol; amylene glycols; 2-methyl-pentanediol-methyl-pentanediol-1,7-heptanediol; glycerine; neopentyl glcycol; trimethylol propane; pentaerythritol; cyclohexane dimethanol; sorbitol; mannitol; glactitiol; talitol; xylitol; 1,2,5,6-tetrahydroxyhexane; styrene glycol; bis($\beta$hydroxyethyl) diphenyl-dimethylmethane; silanediols, e.g., triphenyl silanols; 1,4-dihydroxybenzene; etc.

The polyhydroxyl-containing polymeric compounds useful in this invention include, for instance, polyhydric polyalkylene ethers, polyhydroxyl polyesters, and hydroxyl group-containing, preferably hydroxyl-group terminated, polymers. The polyhydric polyalkylene ethers may have a molecular weight greater than about 750 and a hydroxyl number of from about 10 to 600 and may be derived, for example, by the polymerization of alkylene oxides such as ethylene oxide, propylene oxide, butylene oxide, and the like. Polyhydric polyalkylene ethers may also be prepared by the polymerization of the cyclic ethers such as, for example, dioxane, tetrahydrofuran, and the like, and by the condensation of an alkylene oxide with a glycol such as ethylene glycol, propylene glycol, butylene glycol, and the like.

The hydroxyl-containing polyesters may be obtained by the reaction of aliphatic or aromatic dicarboxylic acids with aliphatic or aromatic polyhydric alcohols in the manner well known to the art in porportions that result in esters having at least two reactive hydroxy groups. Any polyols may be used to form the esters and illustrative of such alcohols are those listed above in the discussion of suitable alcohols alcohols as the active hydrogen-containing reactant. Included within the suitable esters are the diglycerides and hydroxyl-containing castor oil tall oil, soya oil, linseed oil, etc. The latter esters are usually prepolymers prepared by the reaction of the fatty glyceride with low molecular weight polyols. Illustrative, for instance, of castor oil-based prepolymers are propylene glycol monoricinoleate, propylene glycol mono-12-hydroxystearate, neopentyl glycol monoricinoleate, dehydrated castor oil ethylene glycol monoricinoleate, ethylene glycol mono-12 hydroxystearate, triglyceride or ricinoleic acid, epoxidized castor oil, and pentaerythitol tetraricinoleate. Other suitable polymeric compounds include the hydroxyl-terminated olefin polymers such as those of 1,4-butadiene; isoprene; 2,3-dimethylbutadiene; 2-chloro-1,3-butadiene; 2-cyano-1,3-butadiene; and other polymerizable ethylenically unsaturated monomers such as α-olefins of up to 12 carbon atoms such as ethylene, propylene, butene, etc; styrene, acrylonitrile, acrylic acid or ester, methacrylic acid or ester, vinyl chloride, vinylidine chloride, and the like; hydroxyl-terminated condensates of phenol and lower aldehydes and hydroxy-terminated polyepoxides.

THE ORGANIC POLYAMINE COMPOUNDS

Organic polyamine compounds suitable for use in the invention include those which usually contain 2 to about 100,000 or more carbon atoms and at least two primary or secondary amine groups or mixtures of primary and secondary amine groups per molecule. The organic radical to which the amine groups are attached may be aliphatic or aromatic and, although it often contains about 2 to 50 carbon atoms, may contain as much as 100,000 or more carbon atoms. Suitable organic radicals are those which are free from groups which interfere with the desired reaction between the cyclic nitrile compound and the amine or hydroxyl groups. Generally the organic radical consists essentially of carbon and hydrogen, this expression being explained above, and it may be a saturated or ethylenically or acetylenically unsaturated aliphatic radical, a saturated or ethylenically unsaturated cycloaliphatic radical, or an aromatic radical, incluidng alkaryl, aralkyl, and fused ring aromatic radicals.

Typical low-molecular weight organic polyamine compounds include, for example, ethylenediamine; diethylene triamine; 1,2,5,6-hexene-3-tetraamine; 1,4-cyclohexene diamine; 1,4-butyne-2-diamine; 1,3-cyclopentane diamine; 1,4-diaminobenzene; 1,5-diaminonaphthalene; 1,4,6,9-tetraaminoanthracine; etc. Typical polyamine-containing polymeric compounds useful in the invention include, for instance, polyamine polyalkylene ethers and polyamine group-containing polymers such as polyamine-terminated polybutadiene. These may contain up to 100,000 or more carbon atoms. The preparation of the organic polyamine-containing compounds is well known in the art and forms no part of the present invention.

The functionality of the cyclic nitrile component and the organic polyols and polyamines is at least two and may extend to very high values. It is often desirable that the functionality of one or both of the reacting components be considerably higher than two. In general, it is preferred that the cyclic nitrile compounds used have a functionality of two and the fucntionality of the organic polyols and polyamines be varied since it is much more economical to prepare polyfunctional hydroxyl and amine compounds than polyfunctional cyclic nitrile compounds.

The amount of organic polyamine compound is preferably sufficient to provide, upon reaciton with the cyclic nitrile carbonate to form urea linkages, sufficient heat to initiate the reaction between the organic polyhydroxyl compound and the cyclic nitrile compound without the aid of other reactants. Thus, it is desirable that the organic polyhdyroxyl and organic polyamine compounds be present in the formulation in such relative amounts as will provide a ratio of about 1 to 9 and preferably 2 to 4 hydroxyl groups per each amine group. If desired, other compounds containing groups which readily react exothermally with cyclic nitrile compounds, such as epoxy resins, etc, can be added to the component containing the organic amine. Thus, the formulation can be easily varied to obtain the combination of ingredients which will produce the desired result.

The ratio of cyclic nitrile compound to organic polyol and polyamine compounds may vary depending upon the desired properties of the foam being prepared and the functionality of the reacting materials. In general, it is desired to use amounts of cyclic nitrile compound and organic polyhydroxyl and polyamine compounds that will provide a ratio of cyclic nitrile functional group to total polyhydroxyl and polyamine groups of about 0.7 to 10:1 and preferably about 0.7 to 1.4:1.

Suitable catalysts for the compositions of the invention are those generally found useful to catalyze the reaction between cyclic nitriles and reactive hydrogen-containing compounds. The following catalysts are typical of those which may be used in the compositions of the invention. The catalyst may be a basic material such as a tertiary amine having a pKa value greater than 3, e.g., triethylamine, as disclosed in U.S. Pat. No. 3,531,425, the disclosure of which is incorporated herein by reference. Another catalyst for use in accordance with the present invention is a combination of a first metal selected from Groups III through V of the Periodic System and a second metal selected from Groups I and III and the iron series of Groups VII of the Periodic System as disclosed in U.S. Pat. No. 3,652,507, which disclosure is incorporated herein by reference. Yet another useful catalyst in accordance with the present invention is set forth in U.S. Pat. No. 3,702,320 which disclosure is also incorporated herein by reference In accordance with this particular patent, a compound of aluminum, tin, titanium, zinc, bismuth or iron is dissolved in the reaction mixture. If the compound is one of aluminum, tin, titanium or bismuth, the reaction is run in the absence of metals of Groups I, II, and the iron series of Group VIII of the Periodic System. On the other hand, if the metal compound is a compound of zinc or iron, the reaction is run in the absence of metals of Groups III through V of the Periodic System. Other catalysts useful in the present invention are the organic and inorganic fluorides, as disclosed in co-pending U.S. Pat. application Ser. No. 276,640, filed July 31, 1972 now Pat. No. 3,766,147 which is incorporated herein by reference. Still other catalysts useful in the present invention are the N-oxides of amines. The use of these catalysts is disclosed in copending U.S. Pat. application Ser. No. 312,088, filed on Dec. 4, 1972 now U.S. Pat. No. 3,793,254 and the disclosure of this application is incorporated herein by reference. The preferred catalysts are the tertiary aliphatic, aromatic, and heterocyclic tertiary amines such as triethylene diamine, pyridine, N-ethyl morpholine, and N,N-dimethyl aniline. The catalyst, when present, is used at a concentration of about 0.001 to 10% and preferably about 0.01 to 2.0% based on the total weight of solids in the formulation. The catalyst may be incorporated with either the cyclic nitrile carbonate component or with the organic polyhydroxyl and polyamine components or a portion of the catalyst may be added to each of these components.

The polyurethane foam-producing system of the present invention is suitable for the insulation of small speciality items and for repairing insulation which has been torn away or removed for the purpose of making repairs. This system is particularly adaptable for use in dual-dispensing aerosol containers such as those disclosed in U.S. Pat. No. 3,595,440. When a dual-dispensing aerosol container is used, the cyclic nitrile compound, an inert propellant, and any other desirable component is charged into one compartment or chamber of the dual-dispensing container and the organic polyhydroxyl and polyamine-containing compounds are charged together with other desirable additives including an inert propellant in the second chamber of the dual-dispensing aerosol container. When it is desired to apply a layer of foam to a surface using the foam system in a dual-dispensing aerosol container, the nozzle or spout of the dual-dispensing aerosol container is aimed at the area to be covered and the valve which simultaneously effects the discharge of the contents of both compartments of the container is depressed. The propellant forces the cyclic nitrile compound and organic polyhydroxyl and polyamine compounds out of their respective chambers and through a common exhaust conduit wherein intimate mixing of the reactants occurs. The reacting mixture is cast onto the surface to be coated by the force of the propellant. When the desired amount of foam is deposited, the user merely releases pressure on the dual-dispensing valve thereby stopping the flow of the reactants. Thus, only as much foam as is needed is dispensed and since the cyclic nitrile compound and polyhydroxyl and amine-containing compounds do not come in contact until they reach the exit conduit, the foam-producing aerosol system has a long shelf life.

The propellant used to force the reactants from the storage chambers may be any of the propellants usually used in aerosols and which will not react with the cyclic nitrile compound or the organic polyhydroxyl and polyamine compounds or otherwise interfere with the production of polyurethane foam. Typical propellants useful in the invention include inert gases such as nitrogen; the normally gaseous alkanes such as ethane, propane, and butane; low molecular weight halogenated hydrocarbon compounds such as the chlorinated and fluorinated methanes and ethanes, for example, those marketed under the trademark Freon.

When the polyamine and polyol compounds come into contact with the cyclic nitrile compounds, reaction between the amine and hydroxyl groups and the cyclic nitrile groups occurs producing, respectively, urea and urethane linkages. One molecule of carbon dioxide gas is released with the formulation of each urea or urethane linkage. The carbon dioxide acts as a foaming agent and is sufficient by itself to produce the polyurethane foam. It may sometimes be desirable to use, as propellants, materials which will increase foam generation or to add other foaming agents but this is not usually necessary since the carbon dioxide released is adequate. The amount of carbon dioxide released can also be varied by varying the molecular weight and functionality of the reactants or by adding excess cyclic nitrile compound.

In addition to the essential components, other materials may be included in the formulation. Thus, finely divided fillers such as carbon black, talcum, chopped glass fibers, etc.; colorants, including pigments and dyes; surfactants such as silicone oils and emulsifiers, etc. may be added to either or both of the components in the formulation. Similarly, other polymeric or monomeric materials, chain transfer agents, etc. may be added to the formulation to produce the desired foam product.

The invention is further illustrated in the following examples in which the amount of the reactants is expressed in equivalents, wherein equivalent amounts of the reactants have the same number of functional groups.

EXAMPLE I

To a glass flask is added 0.5 equivalent of N,N,N',N'-tetrakis (2-hydroxypropyl)ethylenediamine (sold under the trademark "Quadrol"), 0.5 equivalent of diethylene triamine, and 1 part (based on the total weight of the reactants in both flasks) of triethylene diamine (sold under the trademark "Dabco HR 905"). To a second glass flask is added 1.25 equivalent of butane-1,4-di(nitrile carbonate) and 1 part (based on the total weight of the reactants in both flasks) of a silicone surfactant. The well-mixed contents of each flask are poured into an open dish and rapidly stirred to effect intimate mixing of te reactants. A foam rapidly develops and builds up to a firm consistency in a few seconds. The foam is examined a few hours later and found to be dry and rigid, which is characteristic of a good polyurethane foam.

EXAMPLE II

The procedure of Example I is repeated except that 0.1 equivalent of a polyether polyol having a molecular weight of 450 and four hydroxyl groups per molecule (sold under the trademark "Pep 450") and 0.3 equivalent of Quadrol are substituted for the 0.5 equivalent of Quadrol and 0.6 equivalent of diethylene triamine is added in place of the 0.5 equivalent of diethylene triamine. Upon mixing of the reactants, a firm foam rapidly develops. The foam is examined a few hours later and found to be dry and rigid.

EXAMPLE III

Into a first chamber of a two-chamber aerosol container equipped with a valve which, when depressed, causes the contents of each chamber to be discharged at the same flow rate are charged 0.2 equivalent of Pep 450, 0.6 equivalent of Quadrol, 0.2 equivalent of diethylene triamine, 1 part (based on the total weight of reactants in both chambers) of Dabco HR 905, and 15 parts, based on the total weight of the contents of the first chamber of methylene chloride. Into a second chamber are charged 1.25 equivalent of butane-1,4-di(nitrile carbonate), 1 part (based on the total weight of the reactants in both chambers) of a silicone surfactant, and 15 parts (based on the total weight of the contents of the second chamber) of methylene chloride.

The container is shaken and a uniform layer of reactants is deposited on a flat surface. The reaction mixture rapidly foams into a stable uniform mass. The foam layer is later examined and found to be firm and nontacky.

Although the invention has been described by particular reference to specific examples, it is understood that the breadth of the invention is not limited thereto but is only determined by the scope of the appended claims.

I claim:

1. A unitary polyurethane system comprised of two separately contained components which, when brought together, rapidly react without external heat to form polyurethane foam comprising:

1. A first component comprised of a cyclic nitrile compound having the structural formula

wherein X is

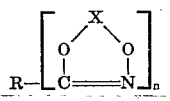

R is an organic radical containing 2 to 200,000 carbon atoms free from reactive hydrogens as determined by the Zerewitinoff test; and $n$ is at least 2, and 2. A second component comprised of a first organic compound having at least 2 hydroxyl groups per molecule and a second organic compound having a total of at least 2 primary or secondary amine groups or mixtures of these per molecule, said first and second organic compounds each containing 2 to 100,000 carbon atoms and said cyclic nitrile carbonate and said first and second organic compounds being free of substituents which interfere with the desired reaction between the cyclic nitrile carbonate and said organic compounds.

2. The composition of claim 1 wherein X is

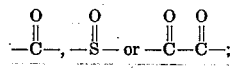

3. The composition of claim 2 wherein at least one of said components contains a catalyst for the reaction between the cyclic nitrile compound and the reactive hydrogen containing compounds.

4. The composition of claim 3 wherein R is a hydrocarbon radical.

5. The composition of claim 4 wherein R contains 2 to 50 carbon atoms.

6. The composition of claim 5 wherein $n$ is 2 to 6.

7. The composition of claim 3 wherein said first organic compound is a polyester polyol having a molecular weight of up to about 75,000 and a hydroxyl number ranging from about 12 to 1,100.

8. The composition of claim 3 wherein said hydroxyl-containing organic compound is a polyether polyol.

9. The composition of claim 3 wherein said catalyst is added to component 2.

10. The composition of claim 3 wherein said catalyst includes a basic compound.

11. The composition of claim 3 wherein the ratio of hydroxyl to amine groups is about 1 to 9:1.

12. The composition of claim 3 wherein the ratio of hydroxyl to amine groups is about 2 to 4:1.

13. The composiiton of claim 11 wherein the ratio of cyclic nitrile carbonate groups to total hydroxyl and amine groups is about 0.7 to 10:01.

* * * * *

UNITED STATES PATENT OFFICE
CERTIFICATE OF CORRECTION

Patent No. 3,855,159          Dated December 17, 1974

Inventor(s) Donald H. Russell

It is certified that error appears in the above-identified patent and that said Letters Patent are hereby corrected as shown below:

Claim 1, column 10, line 4, after "to" insert --about--.

Signed and sealed this 18th day of February 1975.

(SEAL)
Attest:

RUTH C. MASON
Attesting Officer

C. MARSHALL DANN
Commissioner of Patents
and Trademarks